US008728558B2

(12) United States Patent
Haindl et al.

(10) Patent No.: US 8,728,558 B2
(45) Date of Patent: *May 20, 2014

(54) PROCESS FOR THE PRODUCTION OF A FOODSTUFF CONTAINING A FAT CARRIER, A STABILIZER AND A SOLVENT FOR SAID STABILIZER

(75) Inventors: Rudolf Haindl, Salzburg (AT); Hans Mandl, Pfunds (AT)

(73) Assignee: Hama Foodservice Gesmbh, Hof bei Salzburg (AT)

( * ) Notice: Subject to any disclaimer, the term of this patent is extended or adjusted under 35 U.S.C. 154(b) by 23 days.

This patent is subject to a terminal disclaimer.

(21) Appl. No.: 12/981,034

(22) Filed: Dec. 29, 2010

(65) Prior Publication Data

US 2011/0117264 A1 May 19, 2011

Related U.S. Application Data

(60) Division of application No. 11/736,827, filed on Apr. 18, 2007, now Pat. No. 7,887,869, which is a continuation of application No. PCT/AT2005/000414, filed on Oct. 18, 2004.

(30) Foreign Application Priority Data

Oct. 19, 2004 (AT) ................................ A 1750/2004

(51) Int. Cl.
*A23L 2/38* (2006.01)

(52) U.S. Cl.
USPC ........................................................ 426/598

(58) Field of Classification Search
USPC ........................................................ 426/598
See application file for complete search history.

(56) References Cited

U.S. PATENT DOCUMENTS

| | | | |
|---|---|---|---|
| 3,620,769 A | 11/1971 | Peterson | |
| 4,337,278 A * | 6/1982 | Brog | 426/583 |
| 4,389,425 A * | 6/1983 | Burr, II | 426/598 |
| 4,397,927 A * | 8/1983 | Brog | 426/583 |
| 4,446,164 A * | 5/1984 | Brog | 426/583 |
| 4,505,943 A * | 3/1985 | Dell et al. | 426/565 |
| 4,725,445 A * | 2/1988 | Ferrero | 426/565 |
| 4,820,541 A * | 4/1989 | Haring | 426/586 |
| 5,013,573 A * | 5/1991 | Bodor et al. | 426/602 |
| 5,149,559 A * | 9/1992 | Alaers et al. | 426/602 |
| 5,223,300 A * | 6/1993 | Brinkers | 426/603 |
| 5,338,563 A | 8/1994 | Mikulka et al. | |
| 5,725,899 A * | 3/1998 | Cole et al. | 426/598 |
| 6,235,321 B1 | 5/2001 | Kerrigan et al. | |
| 6,322,846 B1 * | 11/2001 | Gandhi et al. | 426/634 |
| 6,663,913 B2 * | 12/2003 | O'Donoghue et al. | 427/2.14 |
| 6,830,772 B2 * | 12/2004 | Haindl et al. | 426/576 |
| 7,033,629 B2 * | 4/2006 | Koss et al. | 426/72 |
| 7,169,416 B2 * | 1/2007 | Koss et al. | 426/72 |
| 7,476,408 B2 * | 1/2009 | Gandhi et al. | 426/634 |
| 7,887,869 B2 * | 2/2011 | Haindl et al. | 426/598 |
| 2003/0157233 A1 | 8/2003 | Haindl et al. | |

FOREIGN PATENT DOCUMENTS

| | | |
|---|---|---|
| DE | 19860437 A1 | 9/1999 |
| EP | 1128735 A1 | 5/2000 |
| EP | 1086625 A1 | 3/2001 |
| GB | 2229077 A | 9/1990 |
| JP | 59055166 A | 3/1984 |
| RU | 2217970 C2 | 12/2003 |
| WO | WO 96/21361 A1 | 7/1996 |

OTHER PUBLICATIONS

Austrian Search Report dated Aug. 5, 2005 in corresponding Austrian Application No. A 1750/2004.
Austrian Search Report dated Aug. 20, 2007 in corresponding Austrian Application No. A 1750/2004.
International Search Report dated Jan. 18, 2006 of corresponding International Application No. PCT/AT2005/000414.
European Search Report dated Aug. 31, 2009 of corresponding European Application No. 05794418.3.
European Patent Office Office Action of corresponding application, No. 05794418.3, dated Mar. 18, 2010.

* cited by examiner

*Primary Examiner* — Carolyn Paden
(74) *Attorney, Agent, or Firm* — Novak Druce Connolly Bove + Quigg LLP

(57) ABSTRACT

A process for the production of a foodstuff containing a fat carrier, a stabilizer and a solvent for the stabilizer, the fat carrier comprising vegetable fat contents having a solid consistency at room temperature comprising dissolving the stabilizer in the solvent, soaking the mixture containing the solvent and the stabilizer in a warmed state for between 15 and 45 minutes at a temperature of between 10 degrees Celsius and 35 degrees Celsius, heating the vegetable fat contents to a temperature between 2% and 20% above their melting point, and mixing the fat carrier to the mixture containing the solvent and the stabilizer in liquid form.

18 Claims, 1 Drawing Sheet

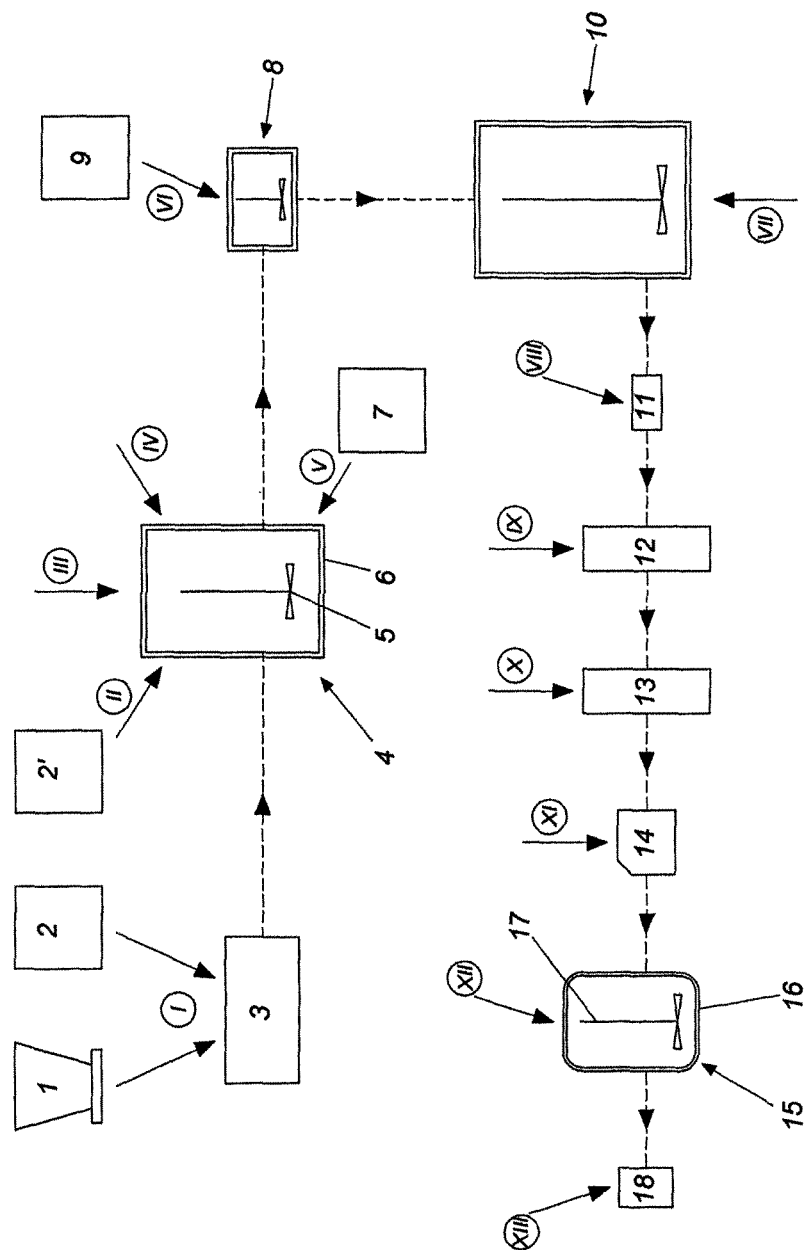

PROCESS FOR THE PRODUCTION OF A FOODSTUFF CONTAINING A FAT CARRIER, A STABILIZER AND A SOLVENT FOR SAID STABILIZER

PRIORITY

This application is a divisional of and claims priority to U.S. Ser. No. 11/736,827, filed Apr. 18, 2007, now U.S. Pat. No. 7,887,869 which is a continuation of application No. PCT/AT2005/000414, filed Oct. 18, 2004, which is a PCT application of Austrian Patent Application No. A 1750/2004, filed Oct. 19, 2004, all commonly owned and having common inventorship. Each of these applications is incorporated herein in its entirety by reference.

BACKGROUND OF THE INVENTION

The invention relates to a process for the production of a foodstuff containing a fat carrier, a stabilizer and a solvent for said stabilizer, the fat carrier comprising vegetable fat contents having a solid consistency at room temperature.

In the processes known to date, skimmed milk or separated milk functions as the solvent for the gelling agent, which can be formed either from gelatine or from vegetable hydrocolloids. After the gelling agent has been dissolved in the solvent and before sterilization and homogenization, vegetable fats are admixed to this mixture to adjust the fat content of the end product. In this context, dispersing of the vegetable fats in the mixture containing the solvent and the gelling agent has proved to be difficult, since warming of the base batch containing solvent and gelling agent or stabilizer should be avoided so as not to adversely influence the stabilization or gelling abilities of the stabilizers or gelling agents used, which means that the vegetable fats mainly employed, for example margarine, were added to the base batch at approximately room temperature in solid form and were mixed with the base batch by the action of shear forces.

BRIEF DESCRIPTION OF THE DRAWING

FIG. 1 shows a diagram of a process flow according to the invention.

DETAILED DESCRIPTION OF THE INVENTION

It is clear that only an unsatisfactory distribution of the vegetable fat content in the base batch can be achieved with such a process, and for this reason the object of the invention was to provide a novel process with which the vegetable fat contents of the fat carrier can be dispersed better in the base batch.

This object is achieved by the invention in that the vegetable fat contents have a solid consistency at room temperature and are warmed to a temperature between 2% and 20% above the melting point, before they are admixed to the mixture containing the solvent and the stabilizer or the gelling agent.

Whereas it was assumed hitherto that warming of the base batch containing the solvent and the stabilizer or the gelling agent is to be avoided if possible, in order to prevent decomposition of the end product, experiments by the applicant have led to the surprising result that if the raw materials are chosen appropriately and certain temperature and pressure parameters are adhered to, warming of the base batch not only does not have an adverse effect on the stability of the end product, but furthermore renders it possible to admix vegetable fats of which, according to the invention, the melting point is between 28° C. and 47° C., favourably above 35° C., preferably about 42° C., to the base batch in liquid form.

According to an alternative embodiment example of the invention, it is thus envisaged that the vegetable fat contents and the mixture containing at least the solvent and the stabilizer or the gelling agent have a temperature above room temperature during mixing, as a result of which dispersing of the vegetable fat contents in the base batch is made considerably easier, leading to a greatly improved distribution of the fat particles in the resulting dispersion. According to a further embodiment example of the invention, the vegetable fat contents used have a content of saturated fatty acids of at least 35%, preferably of at least 45%.

According to a preferred embodiment of the invention, it has proved to be particularly favourable in this context if the vegetable fat contents of the fat carrier, which can be formed substantially, preferably exclusively, from preferably non-lauric palm oil and/or coconut fat and/or cacao butter and/or palm kernel fat or a mixture thereof, are warmed to a temperature between 2% and 20%, preferably 10%, above the melting point, before they are admixed to the mixture containing the solvent and the stabilizer or the gelling agent.

A basic concept of the invention is thus to mix the liquid vegetable fats and the base batch containing the solvent and the stabilizer or the gelling agent at approximately the same temperature above room temperature, which results in a considerably finer distribution of the fat particles in the resulting dispersion. In this connection, the liquid in which the swelling operation of the stabilizer or gelling agent at least starts is called the solvent.

In this context, according to one embodiment variant of the invention, the solvent is formed by skimmed milk having a fat content of less than 0.3%, preferably less than 0.1%. However, it is also possible for the solvent to be a mixture of water and skimmed milk powder or skimmed milk concentrate, in this specific case the stabilizer or the gelling agent preferably being dissolved in the warmed water, before the preferably liquid skimmed milk concentrate or the skimmed milk powder is stirred into this mixture containing water and stabilizer or gelling agent.

A further embodiment example in which the solvent is free from animal fats envisages using soya milk as the solvent for the gelling agent. In this case it is to be noted that soya milk has a considerably higher fat content than skimmed milk, as a result of which the fat content of the solvent in the foodstuff is between 1.5% and 6%, preferably between 3% and 4%. Since according to a preferred embodiment example of the invention the fat content of the soya milk in the end product is approx. 3.5%, less animal and/or vegetable fat contents have to be admixed to the base batch to adjust the fat content of the end product.

As is the case with various solvents, various stabilizers and gelling agents can also be employed for implementation of the inventive concept. In this context, one embodiment variant of the invention envisages that the stabilizer or the gelling agent is gelatine. Experiments by the applicant have shown that if gelatine is used as the gelling agent in particular, appropriate choice and combination of the raw materials for the gelatine are of great importance in order to be able to ensure that the gelatine does not lose its swelling properties when the base batch is heated. In this context, it has proved to be favourable if the gelatine, which is preferably in the form of granules, has a grain size of between 35 and 65 mesh, preferably 50 mesh, and/or a gelatine strength of between 200 and 250 Bloom gram, preferably 220 Bloom gram, and the viscosity of the gelatine is between 34 and 46 millibar, preferably 41 millibar.

A further embodiment example of the invention, which is in turn aimed at keeping the foodstuff to be prepared as far as possible free from animal products, envisages that the stabilizer or the gelling agent comprises exclusively vegetable raw materials, preferably vegetable hydrocolloids. In this context, a suitable stabilizer or a suitable gelling agent can be a mixture of carrageen, cellulose and pectin or konjac flour, it having proved to be advantageous for the stabilizer or the gelling agent additionally to comprise alginate, preferably sodium alginate, and/or guar gum to increase the oil uptake capacity of the end product or for the cuttable consistency of the end product to be acquired again more readily after the action of shear forces.

Although it is entirely conceivable that the solvent and/or the stabilizer or the gelling agent comprise both non-animal and animal raw materials, it has been found in practice that for a simple preparation process it is appropriate to use exclusively non-animal raw materials or exclusively animal raw materials for the solvent and/or the stabilizer or the gelling agent. However, this separation does not apply to the base batch containing the solvent and the gelling agent, that is to say no considerable disadvantages result for the preparation process if an animal solvent is mixed with a vegetable stabilizer or gelling agent and vice versa.

Regardless of the nature of the solvent and stabilizer used or of the gelling agent, according to a further embodiment example according to the invention it is advantageous if the mixture containing solvent and stabilizer or gelling agent is left to swell for between 15 and 45 minutes, preferably 25 and 30 minutes, in order to achieve an intimate mixing of the stabilizer or the gelling agent with the solvent. In this context, one embodiment variant envisages that the stabilizer or the gelling agent is dissolved in a portion of the total amount of solvent in a first step, and the remaining amount of solvent is then admixed to this mixture in a second step, before the swelling operation starts.

It is thus not primarily a matter of how the mixture containing solvent and stabilizer or the gelling agent is prepared, but rather it is essential that the time and temperature parameters are adhered to, that is to say in particular the swelling operation on the base batch at elevated temperature, which according to a preferred embodiment example of the invention is between 10° C. and 35° C., preferably about 20° C., leads to a foodstuff which on the one hand can be warmed and cooled several times without decomposing, and on the other hand is also cuttable again after the action of shear forces.

For complete dissolving of the stabilizer or gelling agent, it has proved favourable in this context if the solvent-stabilizer or gelling agent mixture is heated briefly to a temperature above 50° C., preferably to 55° C., after the swelling operation and before the mixing with the fat carrier.

As already mentioned, for a simple preparation process it has proved advantageous if no mixed forms are used for the solvent and for the gelling agent, that is to say both the gelling agent and the solvent comprise either exclusively animal raw materials or exclusively non-animal raw materials. Surprisingly, this principle does not apply to the fat carrier. Thus, one embodiment example of the process according to the invention indeed envisages that the fat carrier comprises exclusively vegetable fats, preferably non-lauric palm oil.

According to another embodiment example of the invention, however, the fat carrier also comprises animal fats, preferably cream. More preferably, the contents of animal and non-animal fats in such a mixed fat carrier approximately balance each other, so that the fat carrier comprises approx. 50% vegetable and approx. 50% animal fats. However, it is also possible for the fat carrier to consist of vegetable fats to the extent of more than 50% or of animal fats to the extent of more than 50%, but the content of animal fats in the fat carrier should be more than 20%, preferably more than 35%, in the case of a mixed fat carrier. The ratio of animal to vegetable fats in the process according to the invention is thus between 1 to 5:5 to 1, preferably between 1 to 3:3 to 1.

In the case of mixed fat carriers, according to a further embodiment a fine distribution of the animal fat contents in the base batch containing the solvent and the stabilizer or the gelling agent can be achieved if the animal fats, preferably cream, are admixed to the mixture containing the solvent and the stabilizer with constant stirring, preferably after the swelling operation has ended, where the temperature of the animal fats, preferably cream, should be approx. 5° C. during mixing with the solvent-stabilizer/gelling agent mixture.

Regardless of whether the fat carrier comprises exclusively vegetable fat contents or vegetable and animal fat contents, dispersing of the liquid vegetable fats in the solvent-stabilizer/gelling agent mixture (if the fat carrier comprises no animal fat contents) or in the solvent-stabilizer/gelling agent-animal fat mixture (if the fat carrier also comprises animal fats) is made easier if the temperature of the particular base batch is adjusted to a temperature between 2% and 20%, preferably 10%, above the melting point of the vegetable fat contents. Conversely, according to a further embodiment of the invention, it is envisaged that the temperature of the liquid vegetable fats during stirring into the solvent-stabilizer mixture or solvent-stabilizer-animal fats mixture approximately corresponds to the temperature of the solvent-stabilizer mixture or solvent-stabilizer-animal fats mixture. In the case where the vegetable fats of the fat carrier are formed from non-lauric palm oil, this means that both the temperature of the base batch and the temperature of the palm oil during stirring into the base batch are approx. 45° C.

Dissolving of the liquid vegetable fats in the base batch can be carried out, for example, with vigorous stirring, preferably at 6,000 to 8,000 rpm, for example by means of a Homo-Jet mixer. However, the use of a homogenizer for dispersing the liquid vegetable fats is also conceivable, wherein the homogenization should preferably take place in two stages.

For a long non-refrigerated storage stability of the end product, it is particularly advantageous if the solvent-stabilizer-fat carrier mixture is sterilized and homogenized before it is transferred into packaging, it being envisaged, to achieve a uniform homogenization, that the homogenization is carried out at a temperature below 80° C., preferably between 60° C. and 65° C., preferably in two stages, the first stage of the homogenization being carried out under a pressure of about 120 bar and the second stage being carried out under a pressure of about 70 bar. One embodiment example of the invention furthermore envisages that the mixture is sterilized in a UHT unit at a temperature above 135° C., preferably above 140° C., before being transferred into the packaging, preferably before the homogenization. Such a UHT unit can include, for example, a tube or plate heater or also a steam jet pump, the mixture being heated to a temperature above 135° C., preferably to about 142° C., for approx. 6 sec in the second case.

To prevent flocculation from being able to occur in the UHT process, according to a further embodiment example of the invention it is envisaged that the pH-value of the mixture is adjusted to a value above 6, preferably between 6.6 and 6.7, before the sterilization. This adjustment of the pH-value can be carried out, for example, by means of sodium hydroxide solution (NaOH, 1 part of alkali, 5 parts of water).

After the pH-value has been checked and adjusted to the desired value, it has proved favourable to filter the mixture before the sterilization or homogenization, particles having a particle size above 15 mesh, preferably above 20 mesh, being filtered out.

After the sterilization and homogenization, according to a further embodiment of the invention the mixture is pumped into a sterile tank, before being transferred into the packaging, and is cooled there to a temperature between 20° C. and 35° C., preferably between 26° C. and 28° C. In this sterile tank, which has a double-walled jacket for cooling or for warming, the mixture is kept moving by stirring, in order to avoid demixing of the foodstuff or settling of the stabilizer or gelling agent, until transfer into the packaging, which is preferably carried out in an aseptic unit and takes place at approx. 26° C.

According to a further aspect of the invention, a foodstuff prepared by the process according to the invention is to be provided. Such a foodstuff, the vegetable fat contents of which have a melting point above 35° C. and the fat content of which is approx. 15%, is structurally irreversible, which inasmuch means that it can be warmed and cooled again several times without decomposing, that is to say the protein structure, once formed, is also no longer lost when the state of aggregation of the foodstuff is changed, for example by the influence of warmth. This operation of warming and cooling can be repeated as often as desired in this context, and the foodstuff still has the original cuttable consistency after the cooling.

Further experiments by the applicant have shown that a foodstuff produced with the preparation process according to the invention is stable to acids down to a pH-value of about 3.7, while comparable foodstuffs in the most favourable case are stable to acids only down to a pH-value of from 4.5 to 4.2, that is to say the flocculation point of the novel foodstuff is considerably lower than that of conventional foodstuffs, so that a far wider field of use results for foodstuffs prepared by the process according to the invention.

In this context, a first embodiment example of a novel foodstuff, in which the solvent is formed by soya milk, envisages that the fat content of the soya milk in the foodstuff is approx. 3.5%, while the fat content of the fat carrier is approx. 11.5%. If the solvent is formed by skimmed milk, according to another embodiment example of the invention, the fat content of the fat carrier is approx. 15%.

Further details of the invention and the advantages achieved by it can be seen from the following explanation of the embodiment example shown in the drawing. In this, the sole FIGURE shows a diagram of a process flow according to the invention.

In a first step I, the gelling agent 1 is mixed with a portion 2 of the total amount of solvent in a mixing device 3, for example in a jet mixer. In the embodiment example shown, the gelling agent 1 is formed by gelatine having a particle size of 50 mesh and a gelatine strength of 220 Bloom gram, while skimmed milk having a fat content of 0.3% is employed as the solvent. In the mixing device 3, the total amount of the gelling agent 1 is mixed with a portion 2 of the total amount of solvent, the portion 2 of the amount of solvent being kept at a temperature of approx. 5° C.

It would of course also be possible for the skimmed milk used as the solvent to be obtained from skimmed milk concentrate diluted with water. In this case, the gelling agent 1 would be dissolved in a portion of the total amount of water and the remaining portions of water would be admixed to this mixture before the introduction of the skimmed milk concentrate.

After the stabilizer or the gelling agent 1 has been mixed with a portion 2 of the total amount of solvent in the mixing device 3, this mixture is pumped, for example by mean of a pump (not shown), into a mixing tank 4, which can be constructed as a steel tank having a double-walled jacket 6 and in which a stirring device 5 which moves at about 150 to 200 rpm is arranged. The remaining amount of solvent 2', which likewise has a temperature of about 5° C., is subsequently (step II) admixed to the gelling agent 1-solvent 2 mixture in the mixing tank 4. The resulting mixture, which contains 100% of the gelling agent 1 and 100% of the solvent 2, 2', is left to swell in the mixing tank 4, with constant stirring, for approx. 25 to 30 min at a temperature between 10° C. and 35° C., the stirrer 5 rotating at approx. 150 to 200 rpm (step III).

In the next step IV, the mixture of gelling agent 1 and solvent 2, 2' in the mixing tank 4 is warmed briefly to 55° C. This warming can be carried out, for example, by means of hot steam passed through the double-walled jacket 6 of the mixing tank 4. Throughout the entire period, the mixture should be kept moving by means of the stirrer 5, in order in this way to prevent demixing and to ensure the gelling agent is dissolved completely.

Thereafter, in step V animal fats 7 are added to the mixture containing gelling agent 1 and solvent 2, 2', likewise with constant stirring. In the embodiment example shown, these animal fats 7 are formed from cream having a fat content of between 30 and 50%, the temperature of the animal fats 7 being approx. 5° C. during the stirring in.

By stirring in of the approx. 5° C. cold animal fats 7, the solvent 2, 2'-gelling agent 1-animal fats 7 mixture cools to a temperature below 50° C., and in the next step VI is pumped into a homogenization device 8 and adjusted there, if necessary, to a temperature of 45° C. This temperature of 45° C. is about 10% above the melting point of the vegetable fats 9, which are admixed in step VI to the mixture in the homogenization device 8. The homogenization device 8 in this context can be formed by a Homo-Jet mixer, with which the vegetable fats 9 can be stirred in at 6,000 to 8,000 rpm, or by a conventional two-stage homogenizer with pressure levels of 80/60.

A basic concept of the process according to the invention is thus that of stirring in the vegetable fats 9 in liquid form, that is to say the vegetable fats 9 must be heated to a temperature above the melting point of the vegetable fats 9 during the stirring in. In the embodiment example shown, the vegetable fats 9 are formed from non-lauric palm oil, the melting point of which is 0 approx. 42° C. That is to say, the palm oil is heated to approx. 45° C., before it is stirred into the gelling agent 1-solvent 2, 2'-animal fats 7 mixture, the temperature of which likewise is 45° C. After the mixture of gelling agent 1, solvent 2, 2' and fat carrier 7, 9 has been dispersed in the homogenization device 8, this mixture is pumped into the main tank 10, where it is kept at a temperature of approx. 45° C. with constant stirring at 250 to 350 rpm. The pH-value of the mixture containing all the raw materials 1, 2, 2', 7, 9 is checked in this step VII. To avoid flocculation during the subsequent UHT process, the pH-value should be 6.6 to 6.7. Too low a pH can be corrected, for example, with sodium hydroxide solution (NaOH; 1 part of alkali, 5 parts of water).

In step VIII, the mixture is pumped over a filter 9, which filters out particles having a particle size above 15 mesh, preferably above 20 mesh, into a UHT unit 12. In the UHT unit 12, brief heating above 135° C., preferably above 140° C. is carried out in step IX to achieve a long storage stability of the end product. In the embodiment example shown, the UHT unit 12 operates by the steam sterilization process, that is to say the mixture is heated to 142° C. for approx. 6 sec. However, the use of plate or tube heaters would of course also be conceivable and achieve the aim.

Thereafter, the mixture is fed to a cooling device 13, where it is cooled in step X to a temperature between 60° C. and 65° C. From the cooling unit 13, the mixture is pumped into a homogenizer 14, and homogenized there in two stages in step XI, the first stage of the homogenization being carried out under a pressure of about 120 bar and the second stage under a pressure of about 70 bar.

Thereafter, the mixture is pumped into a sterile tank 15, which, like the mixing tank 4, has a double-walled jacket 16 and a stirrer 17. In the sterile tank 15, the mixture is adjusted to a temperature between 26° C. and 28° C. in step XII, with constant stirring, before preferably aseptic transfer is carried out in step XIII at about 26° C. into, for example, packaging units 18 made of cardboard and/or paper and lined with aluminium and/or plastic (polyethylene). Rapid cooling at least to 15° C. in a refrigeration room should subsequently be carried out.

The example of a possible preparation process described is of course not to be understood in the limiting sense, but is merely one example of numerous possibilities for realizing the inventive concept. Adherence to the temperature parameters, in particular during the swelling operation on the base batch and during stirring of the liquid vegetable fats into the base batch, is at any rate essential to the invention.

The invention claimed is:

1. A product of a process for the production of a foodstuff containing a fat carrier, a stabilizer, said stabilizer being a gelling agent, and a solvent for said stabilizer, said solvent being soya milk, the fat carrier comprising vegetable fat contents having a solid consistency at room temperature, wherein the fat carrier contains a mixture of animal fats and vegetable fats in a ratio between 1 to 5:5 to 1 and wherein the vegetable fat contents of the fat carrier are formed from non-lauric palm oil or wherein the vegetable fat contents of the fat carrier are coconut fat, cocoa butter, or palm kernel fat or a mixture thereof, comprising: dissolving the stabilizer in the solvent; soaking the mixture containing the solvent and the stabilizer in a warmed state for between 15 and 45 minutes at a temperature of between 10° C. and 35° C.; heating the vegetable fat contents to a temperature between 2% and 20% above their melting point; admixing the fat carrier to the mixture containing the solvent and the stabilizer in liquid form;

wherein said product is stable to acids and flocculation resistant down to a pH-value of about 3.7.

2. The product of a process according to claim 1, wherein the solvent is warmed up to a temperature of between 25 C.° and 40 C.° before dissolving the stabilizer.

3. The product of a process according to claim 1, wherein the stabilizer is dissolved in a portion of the total amount of solvent in a first step, and the remaining amount of solvent is then admixed to this mixture in a second step, before the soaking operation starts.

4. The product of a process according to claim 1, wherein the mixture containing solvent and stabilizer is left to soak for between 25 and 30 minutes.

5. The product of a process according to claim 1, wherein during the soaking operation the temperature of the mixture containing solvent and stabilizer is about 20° C.

6. The product of a process according to claim 1, wherein the solvent-stabilizer mixture is heated briefly to a temperature above 50° C. after the soaking operation and before the mixing with the fat carrier.

7. The product of a process according to claim 1, wherein this mixture is heated to a temperature of 55° C.

8. The product of a process according to claim 1, wherein said vegetable fat contents and the mixture containing at least the solvent and the stabilizer have a temperature above room temperature during the mixing.

9. The product of a process according to claim 1, wherein the vegetable fat contents are heated to a temperature of about 10% above the melting point.

10. The product of a process according to claim 1, wherein the melting point of the vegetable fat contents is between 28° C. and 47° C.

11. The product of claim 10 wherein said stabilizer consists of vegetable raw materials.

12. The product of claim 10 wherein said stabilizer comprises carrageen, cellulose, and pectin.

13. The product of claim 12 wherein said alginate is sodium alginate.

14. The product of claim 10 wherein said stabilizer comprises carrageen, cellulose, and konjac flour.

15. The product of claim 10 wherein said stabilizer comprises alginate, guar gum or a mixture thereof.

16. The product of claim 10 wherein said stabilizer comprises guar gum.

17. The product of a process for the production of a milk-free foodstuff containing a milk-free fat carrier a stabilizer, said stabilizer being a gelling agent said gelling agent is gelatine used in the form of granules said granules having a grain size between 35 and 65 mesh and a gelatine strength between 200 and 250 bloom gram, and a milk-free solvent for said stabilizer, said solvent being soya milk, the fat carrier comprising vegetable fat contents having a solid consistency at room temperature and free from animal fats, said vegetable fat selected from the group consisting of non-lauric palm oil or wherein the vegetable fat contents of the fat carrier are coconut fat, cocoa butter, or palm kernel fat or a mixture thereof, comprising: dissolving the stabilizer in the solvent; soaking the mixture containing the solvent and the stabilizer in a warmed state for between 15 and 45 minutes at a temperature of between 10° C. and 35° C.; heating said vegetable fat content to a temperature between 2% and 20% above their melting point; admixing the fat carrier to the mixture containing the solvent and the stabilizer in liquid form, wherein said product is stable to acids and flocculation resistant down to a pH-value of about 3.7.

18. The product of claim 17 wherein said vegetable raw materials are vegetable hydrocolloids.

* * * * *